J. S. WHITE AND J. SEKAVEC.
MACHINE FOR WINDING GOLF BALLS.
APPLICATION FILED JULY 14, 1920.

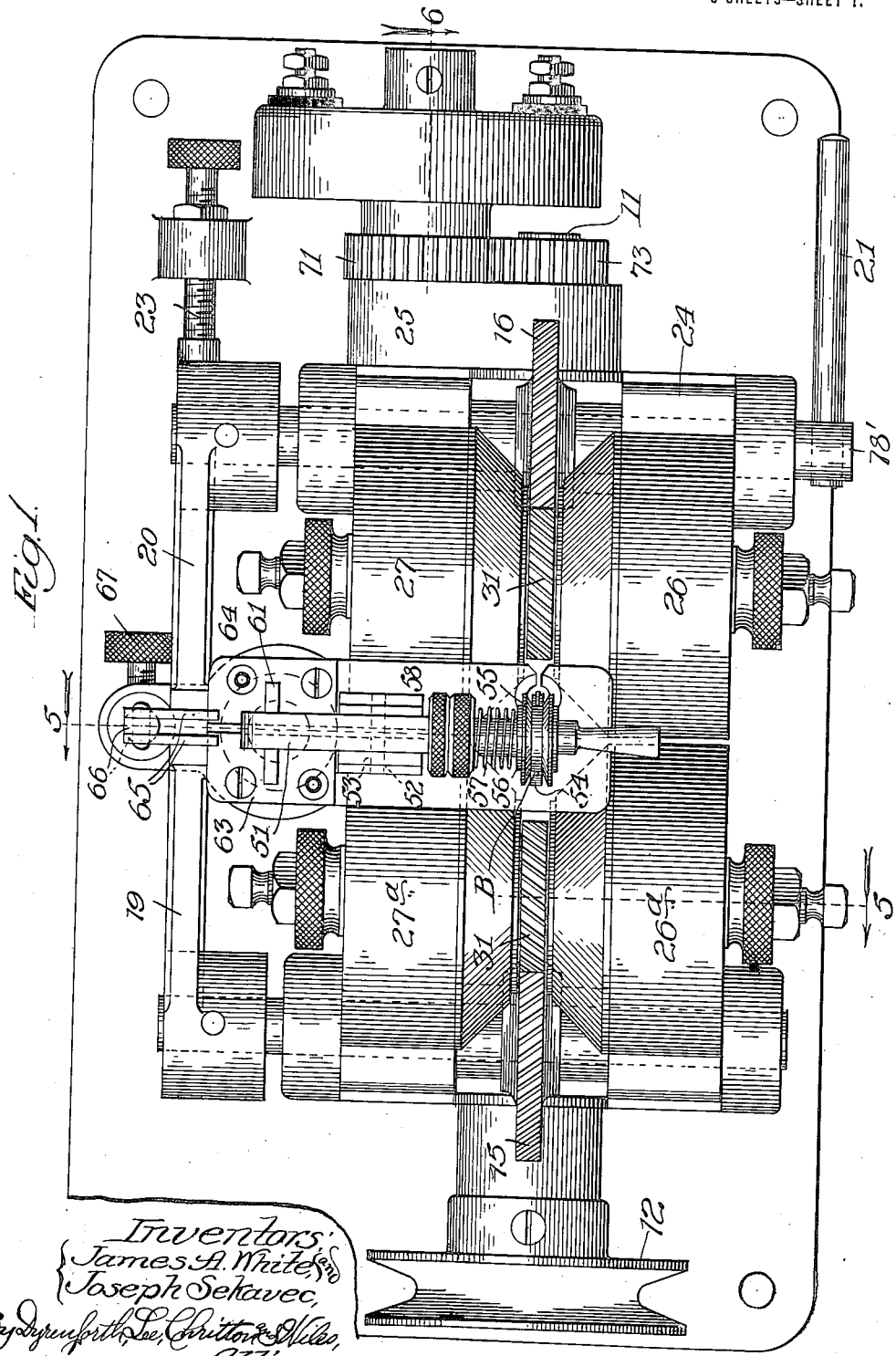

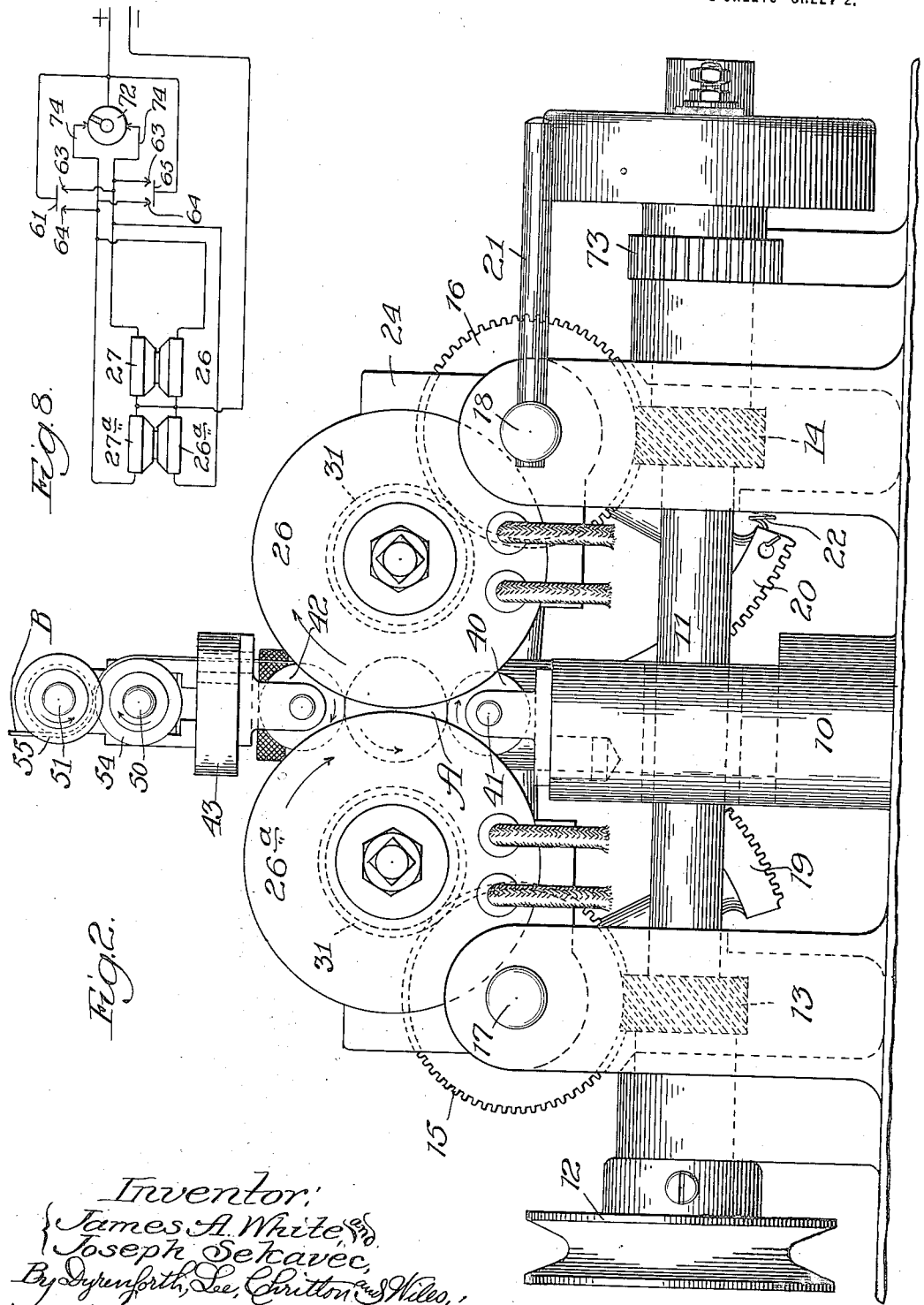

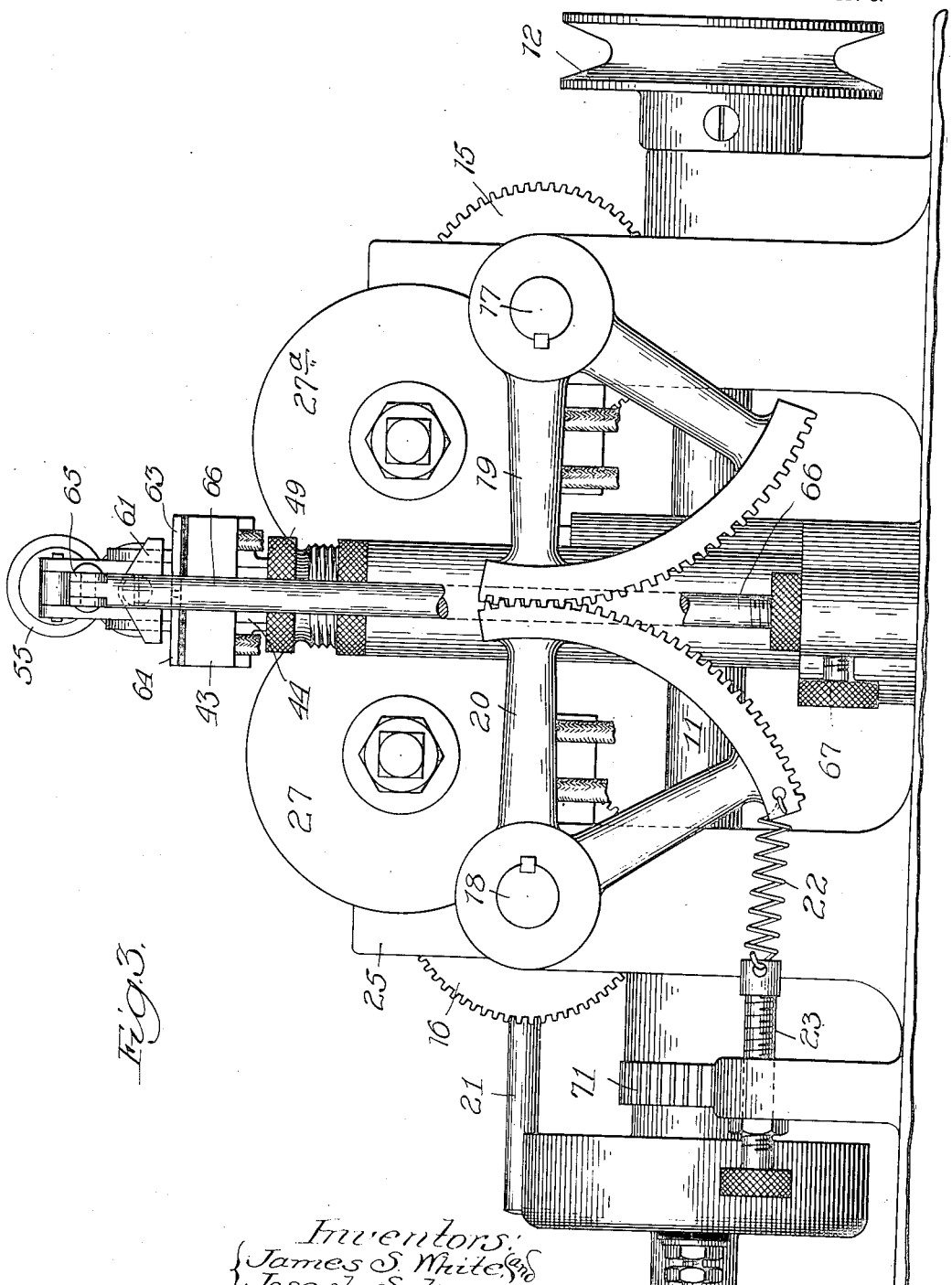

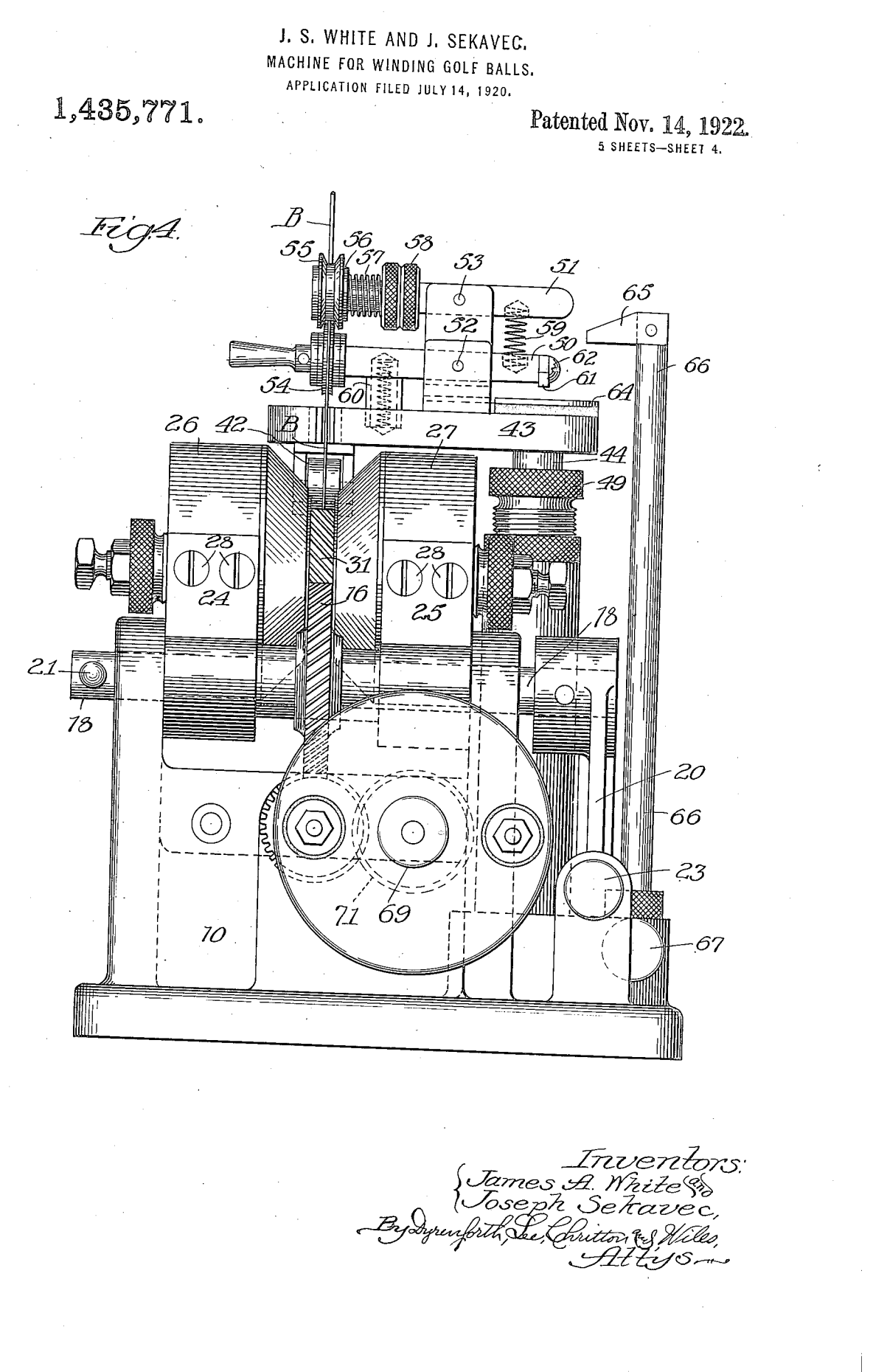

1,435,771.

Patented Nov. 14, 1922.

J. S. WHITE AND J. SEKAVEC.
MACHINE FOR WINDING GOLF BALLS.
APPLICATION FILED JULY 14, 1920.
1,435,771.
Patented Nov. 14, 1922.
5 SHEETS—SHEET 5.
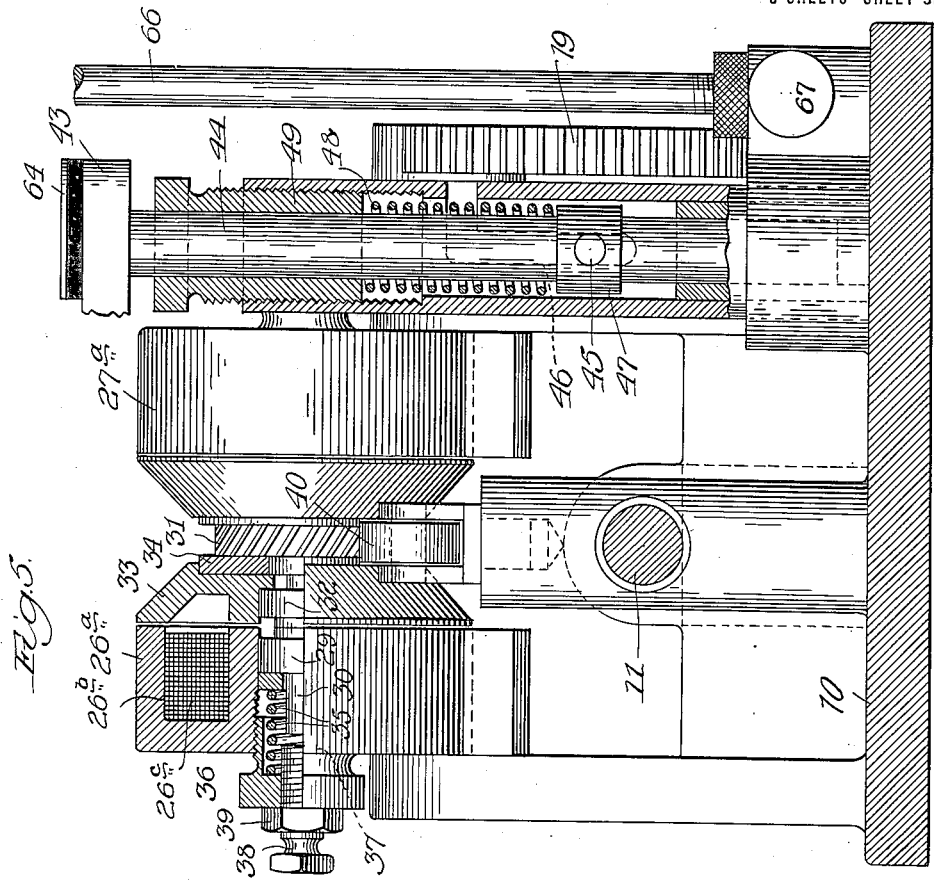
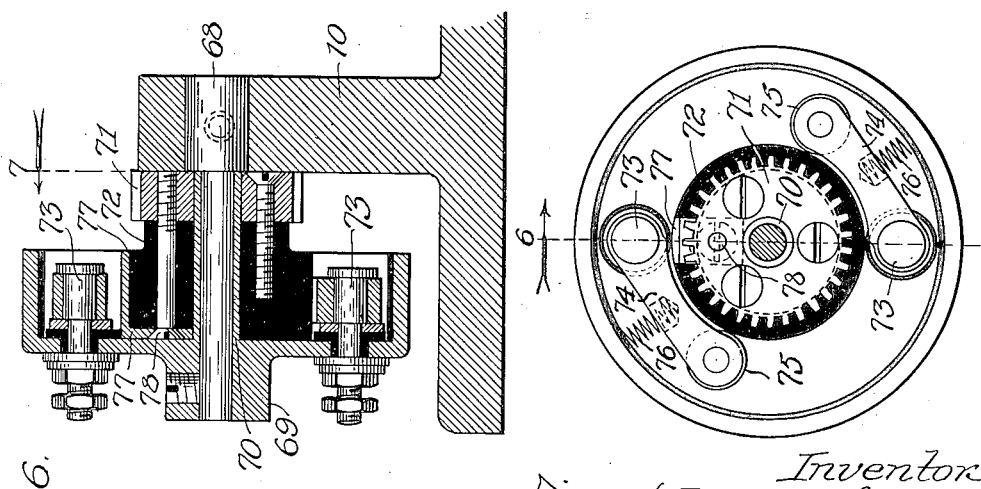
Inventors:
James S. White,
Joseph Sekavec,
By Dyrenforth, Lee, Chritton & Wiles,
Attys.

Patented Nov. 14, 1922.

1,435,771

UNITED STATES PATENT OFFICE.

JAMES S. WHITE AND JOSEPH SEKAVEC, OF CHICAGO, ILLINOIS, ASSIGNORS TO GEORGE A. CHRITTON, TRUSTEE, OF CHICAGO, ILLINOIS.

MACHINE FOR WINDING GOLF BALLS.

Application filed July 14, 1920. Serial No. 396,169.

*To all whom it may concern:*

Be it known that JAMES S. WHITE and JOSEPH SEKAVEC, citizens of the United States, residing at Chicago, in the county of Cook and State of Illinois, have invented a new and useful Improvement in Machines for Winding Golf Balls, of which the following is a specification.

This invention relates to the method of and machines for winding golf balls and is fully described in the following specification and shown in the accompanying drawings in which Fig. 1 is a plan view of a machine embodying the invention;

Fig. 2 is a front elevation of the same;

Figs. 3 and 4 are rear elevation and end elevations respectively;

Fig. 5 is a partial vertical section on the broken line 5, 5 of Fig. 1;

Fig. 6 is a partial vertical section on the line 6 of Figs. 1 and 7;

Fig. 7 is an end elevation of the timer as viewed from the line 7 in Fig. 6; and Fig. 8 is a diagram of connections.

The embodiment as illustrated consists of a main frame 10 having a plurality of uprights extending therefrom, in two of which is journalled the main shaft 11. A grooved pulley 12 is secured on this shaft and is driven by any suitable source of power through a round belt, (not shown). Worms, 13 and 14, are secured on the shaft 11 and mesh with the worm wheels 15 and 16 on the shafts 17 and 18 respectively, the latter being carried in suitable journals on the main frame 10. These shafts have gear sectors 19 and 20 keyed thereon as shown in Fig. 3 so as to cause them to oscillate simultaneously in opposite directions. The shaft 18 is provided with an operating lever 21. The sectors are normally held in the position shown by the spring 22 the tension of which may be adjusted by means of the screw 23.

Blocks 24 and 25 are keyed to the shaft 18 and have electromagnets 26 and 27 secured thereto by means of screws 28. A shaft 17 carries similar electromagnets 26ª and 27ª, which are mounted in the same way. It will thus be seen that the magnets 26, 27, 26ª and 27ª may be raised and reversely rotated about the shafts 18 and 17 by depressing the lever 21, thereby permitting the insertion or withdrawal of a ball to be wound, as will later be described.

These electromagnets are all alike and reference is now had to the cross section through the electromagnet 26ª as shown in Fig. 5. The magnets 26ª and 27ª are bored in alignment and provided with bushings 29 which are slidably mounted therein. A shaft 30 is journaled in each pair of bushings 29 and carries a worm wheel 31 which meshes with the worm wheel 15. A similar bushing 32 is mounted on the shaft 30 adjacent to bushing 29 and carries a soft iron armature 33 which lies in front of the magnet 26ª, and has an angular bearing 34 which is normally pressed against the side of the worm wheel or spiral gear 31. These parts are pressed together toward the worm wheel 31 by means of a spring 35 which is mounted in the hollow cap 36 which is threaded into the magnet 26ª. Thus the pressure exerted by the spring 35 is adjusted. The electromagnet 26ª is hollow as shown at 26ᵇ and contains a coil 26ᶜ. The armature 33 normally stands some distance away from the magnet 26ª, but when an electric current is passed thru the coil 26ᶜ the armature 33 is drawn toward the core 26ª compressing the spring 35.

It will thus be seen that the two springs 35 ordinarily counterbalance each other so as to permit the armatures to float freely between their respective electromagnet coils. When, however, one of the armatures is drawn to one side compressing the spring the shaft 30 also has a tendency to move endwise. To take care of this end thrust we have provided a hardened steel ball 37 which is set in the end of a screw 38 which is threaded into the cap 36 and adjustably held by means of a lock nut 39.

The ball A which is being wound is retained between the four armatures or cones 33, and is supported by the idlers 40 which is free to turn about the shaft 41, the latter being carried by a bearing on the main frame 10. A similar idler wheel 42 bears upon the top of the ball A and supports an arm 43, the latter having a vertical rod 44 slidable in a suitable guide way in the main frame. The arm 43 and rod 44 are prevented from turning by means of a pin 45 which extends through the rod and into the stop 46 in the side of the vertical passage way. A collar 47 is also carried by the pin 45 and serves as an abutment for the spring 48 which surrounds the rod 44 and bears at its upper end against the threaded nipple 49, which also serves as a guide for the rod 44.

The arm 43 has an upright to which is pivotally mounted two levers, 50 and 51, on pins 52 and 53 respectively. The lower lever 50 carries a roller 54 which is journaled thereon while the upper lever 51 has a slanted roller 55 journaled thereon immediately over the idle roller 54. A washer 56 movable longitudinally of the lever 51 bears against the flange wheel 55 due to the action of the spring 57, the pressure of the spring being adjustably applied by the lock nut 58. The spring 59 between the arms 50 and 51 tends to force the wheels 54 and 55 toward each other. A spring 60 placed upon the opposite end of the lever 50 tends to raise the lower wheel 54 away from the ball A. The thread or band of rubber B which is being wound upon the golf ball passes around the grooved pulley 55, the pulley 54 and around under the roller 42 to the ball. The tension due to the spring 57 tightens the band B and pulls the arms 50 and 51 down against the action of the spring 60.

It sometimes happens that the band B breaks, in which case it is desirable that the ball A shall be held stationary until the machine is again properly threaded. Provision is made for this as follows:

A balance arm 61 is freely pivoted on the end of the lever 50 by means of a screw 62. Two insulated plates 63 and 64 are placed immediately beneath the arm 61 and carefully insulated from the arm 43. These plates are connected as shown diagrammatically in Fig. 8 with the coils of the electromagnets 26, 27, 26$^a$ and 27$^a$, so that when the arm 61 strikes the plates 63 and 64 the magnet coils are energized thereby stopping the cones and preventing the ball A from turning.

It will also be understood that as the ball A is wound and its diameter increases, the arm 43 will be raised and at the same time the electromagnets 26 and 26$^a$ will be forced outwardly in opposite directions and turn about the shaft 17 and 18.

Two contacts 65 also overhang the plates 63 and 64 and are carried by an upright 66 which is slidable in the main frame 10 and adjustably held by means of a thumb screw 67. The height of this is so adjusted that when the ball reaches the desired size the contacts 65 engage the plates 63 and 64 and cause the ball A to stop as before.

Referring now to Figs. 1, 6 and 7, the main frame 10 carries a stud 68 upon which is secured a timer housing 69 having a sleeve extension 70. The gear 71 is secured to the timer body 72 and both are journaled on the sleeve 70. The gear 71 meshes with the gear 73 on the shaft 11.

The timer housing 69 has two insulated pins 73 mounted therein. Contact fingers 74 are hingeably mounted on these pins and carry at their outer end contact rollers 75 which engage the outer surface of the timer body 72, and are pressed thereto by means of the spring 76. The timer body 72 is made of an insulating material and carries a metal segment 77 which is connected to the gear 71 by means of the screw 78.

The electromagnets 26 and 27$^a$ are electrically connected by a single lead to one of the pins 73 while the magnets 26$^a$ and 27 are likewise connected to the other pin 73. It will thus be seen that as the timer body 72 rotates, the metal segment 77 will alternately energize the electromagnets 26 and 27$^a$ and then on its next half revolution will energize the magnets 26$^a$ and 27. As long as none of the magnets are energized the ball A will rotate about an axis normal to the paper as shown in Fig. 2 whereas when the electromagnets 26 and 27$^a$ are energized it will rotate about an axis lying substantially in a horizontal plane and which is substantially parallel to an element of either of the contacting cones, said element at the time being in contact with the ball A. If the other two electromagnets 26$^a$ and 27 only are energized, the ball will rotate about a horizontal axis substantially 45° from its normal axis and 90° from the axis just described. Thus a means is provided to automatically turn the ball at predetermined intervals, thereby insuring that the ball will be uniformly wound and will remain a true sphere.

While we have shown and described but a single embodiment of our invention, it is to be understood that it is capable of many modifications. Changes, therefore, in the construction and arrangement may be made which do not depart from the scope of the appended claims in which it is my intention to claim all novelty inherent in my invention as broadly as possible in view of the prior art.

What we claim as new and desire to secure by Letters Patent is:

1. In a machine for winding balls and the like, a frame, two substantially parallel members journaled therein, means for causing said members to oscillate in opposite directions, eccentric bearings secured to each member, shafts in said bearings, means for driving said shafts in opposite directions, a pair of cones on each shaft, and stops on each side the centerline of said shafts, whereby a ball may be rotated between said cones.

2. In a machine for winding balls and the like, a frame, two substantially parallel members journaled therein, means for causing said members to oscillate in opposite directions, eccentric bearings secured to each member, shafts in said bearings, means for driving said shafts in opposite directions, a pair of cones on each shaft, and stops on each side the centerline of said shafts, whereby a ball may be rotated between said cones and means for stopping said cones in pairs which lie on diametrically opposite sides of said ball, while the opposite pair of cones is being driven.

3. In a machine for winding balls and the like, a frame, an oppositely arranged pair of cones on each of two parallel axes adapted to engage a ball on four sides, means for intermittently retarding diagonally opposite cones while the other two are driven at a uniform speed and means for turning all said cones to cause the ball to rotate about different axes.

4. In a machine for winding balls and the like, a frame, two oppositely arranged pairs of cones adapted to engage a ball on four sides, means for retaining the ball in said position, and means for intermittently driving said cones at the same speed and at different speeds relative to each other to cause the ball to rotate about different axes.

5. In a machine for winding balls and the like, a frame, two shafts carried thereby, two oppositely arranged pairs of cones on said shaft adapted to engage a ball on four sides, means for retaining the ball in said position, and means for intermittently driving said cones at the same speed and at different speeds relative to each other to cause the ball to rotate about different axes.

6. In a machine for winding balls and the like, a frame, two oppositely arranged pairs of cones adapted to engage a ball on four sides, means for retaining the ball in said position and means for turning said cones to cause the ball to rotate, the opposite points of contact on said ball lying on lines which are substantially at right angles and means for drawing two opposite cones away from the ball.

7. In a machine for winding balls and the like, a frame, two shafts carried thereby, two oppositely arranged pairs of cones on said shafts, adapted to engage a ball on four sides, means for retaining the ball in said position and means for turning said cones to cause the ball to rotate, the opposite points of contact on said ball lying on lines which are substantially at right angles, and means for drawing two opposite cones away from the ball.

8. In a machine for winding balls and the like, a frame, two oppositely arranged pairs of cones adapted, to engage a ball on four sides, means for retaining the ball in said position and means for turning said cones to cause the ball to rotate, the opposite points of contact on said ball lying on lines which are substantially at right angles, and means for drawing either set of two opposite cones away from the ball.

9. In a machine for winding balls and the like, a frame, two oppositely arranged pairs of cones adapted to engage a ball on four sides, means for retaining the ball in said position and means for turning said cones to cause the ball to rotate, the opposite points of contact on said ball lying on lines which are substantially at right angles, and electromagnets for drawing two opposite cones away from the ball.

10. In a machine for winding balls and the like, a frame, two oppositely arranged pairs of cones adapted to engage a ball on four sides, means for retaining the ball in said position and means for turning said cones to cause the ball to rotate, the opposite points of contact on said ball lying on lines which are substantially at right angles, and means for drawing either set of two opposite cones from the ball, said last named means being operated intermittently by the mechanism for driving said shafts.

11. In a machine for winding balls and the like, a frame, two oppositely arranged pairs of cones adapted to engage a ball on four sides, means for retaining the ball in said position and means for turning said cones to cause the ball to rotate, the opposite points of contact on said ball lying on lines which are substantially at right angles, electro-magnets for drawing two opposite cones away from the ball, a source of electric current, a main shaft for driving said two shafts and a timer on said main shaft intermittently connecting said source of current to the electro-magnets controlling one or the other of said sets of cones.

12. In a machine for winding balls and the like, a frame, two oppositely arranged pairs of cones, adapted to engage a ball on four sides, means for retaining the ball in said position and means for turning said cones to cause the ball to rotate, the opposite points of contact on said ball lying on lines which are substantially at right angles, electro-magnets for drawing two opposite cones away from the ball, a source of electric current, a main shaft for driving said two shafts and a timer on said main shaft intermittently connecting said source of current to the electro-magnets controlling one or the other of said sets of cones, a means for tensioning the thread being wound on said ball and means connected therewith for short circuiting all electro-magnets when the tension on said thread falls below a predetermined amount, thereby stopping all cones.

13. In a machine for winding balls and the like, a frame, two oppositely arranged pairs of cones adapted to engage a ball on four sides, and in substantially the same plane, a roller beneath said plane adapted to support the ball between said cones, a roller adapted to press upon the top of said ball, means for turning said cones to rotate the ball and means operable by said last named roller for causing the ball to cease rotating when the ball has reached a predetermined diameter.

14. In a machine for winding balls and the like, a frame, two oppositely arranged pairs of cones, adapted to engage a ball on four sides, and in substantially the same plane, a roller beneath said plane adapted to support the ball between said cones, a roller adapted to press upon the top of said ball, means for turning said cones to rotate the ball and means operable by said last named roller for causing the ball to cease rotating when the ball has reached a predetermined diameter, the thread being wound upon said ball passing around the last named roller.

15. In a machine for winding balls and the like, a frame, two oppositely arranged pairs of cones adapted to engage a ball on four sides, and in substantially the same plane, a roller beneath said plane adapted to support the ball between said cones, a roller adapted to press upon the top of said ball, means for turning said cones to rotate the ball and means operable by said last named roller for causing the ball to cease rotating when the ball has reached a predetermined diameter, the thread being wound upon said ball passing around the last named roller, and being pressed to the ball by said roller.

16. In a machine for winding balls and the like, a frame, two oppositely arranged pairs of cones, adapted to engage a ball on four sides, and in substantially the same plane, a roller beneath said plane adapted to support the ball between said cones, a roller adapted to press upon the top of said ball, means for turning said cones to rotate the ball, means operable by said last named roller for causing the ball to cease rotating when the ball has reached a predetermined diameter, and means for causing said cones to turn the ball intermittently in a plurality of planes passing thru the point of contact of said ball and rollers.

17. In a machine for winding balls and the like, a frame, two oppositely arranged pairs of cones, adapted to engage a ball on four sides, and in substantially the same plane, a roller beneath said plane adapted to support the ball between said cones, a roller adapted to press upon the top of said ball, means for turning said cones to rotate the ball, means operable by said last named roller for causing the ball to cease rotating when the ball has reached a predetermined diameter, and means for causing said cones to turn the ball intermittently in a plurality of planes passing thru the point of contact of said ball and rollers, the thread being wound on the ball passing under one of said rollers at the point of contact with said ball.

18. In a machine for winding balls, means for rotating the ball to be wound, means for feeding a thread of material to said ball under tension, an element engaging the tensioned part of said thread and means operable by said element to stop said first mentioned means when the thread breaks.

JAMES S. WHITE.
JOSEPH SEKAVEC.